(12) United States Patent
Murphy et al.

(10) Patent No.: US 9,348,938 B2
(45) Date of Patent: May 24, 2016

(54) METHODS FOR MANIPULATING WEB PAGES

(75) Inventors: Nick Murphy, Farnham (GB); Chon Hock Leow, Menlo Park, CA (US)

(73) Assignee: ZiiLABS Inc., Ltd., Hamilton (BM)

( * ) Notice: Subject to any disclaimer, the term of this patent is extended or adjusted under 35 U.S.C. 154(b) by 1176 days.

(21) Appl. No.: 11/567,689

(22) Filed: Dec. 6, 2006

(65) Prior Publication Data
US 2007/0130525 A1 Jun. 7, 2007

Related U.S. Application Data

(60) Provisional application No. 60/597,534, filed on Dec. 7, 2005, provisional application No. 60/744,593, filed on Apr. 10, 2006.

(51) Int. Cl.
G06F 3/048 (2013.01)
G06F 17/30 (2006.01)

(52) U.S. Cl.
CPC ............................... G06F 17/30905 (2013.01)

(58) Field of Classification Search
USPC .......................... 715/744, 745, 746, 747, 864
See application file for complete search history.

(56) References Cited

U.S. PATENT DOCUMENTS

| | | | |
|---|---|---|---|
| 4,790,028 A | 12/1988 | Ramage | |
| 5,615,384 A | 3/1997 | Allard | |
| 5,670,984 A | 9/1997 | Robertson | |
| 5,689,287 A | 11/1997 | Mackinlay | |
| 5,754,348 A | 5/1998 | Soohoo | |
| 6,044,385 A | 3/2000 | Gross | |
| 6,081,277 A | 6/2000 | Kojima | |
| 6,119,135 A | 9/2000 | Helfman | |
| 6,208,342 B1 | 3/2001 | Mugura | |
| 6,259,432 B1 * | 7/2001 | Yamada et al. ............... | 345/159 |
| 6,300,947 B1 * | 10/2001 | Kanevsky ..................... | 715/866 |
| 6,400,376 B1 | 6/2002 | Singh | |
| 6,401,094 B1 | 6/2002 | Stemp | |
| 6,466,203 B2 | 10/2002 | Van Ee | |
| 6,720,981 B1 | 4/2004 | Berstis | |
| 6,768,497 B2 * | 7/2004 | Baar et al. ..................... | 345/661 |
| 7,003,736 B2 * | 2/2006 | Kanevsky et al. ............ | 715/837 |
| 7,013,435 B2 * | 3/2006 | Gallo et al. ................... | 715/850 |
| 7,028,264 B2 | 4/2006 | Santoro | |
| 2004/0263513 A1 | 12/2004 | Smith | |
| 2005/0216859 A1 | 9/2005 | Paek et al. | |
| 2005/0246651 A1 * | 11/2005 | Krzanowski .................. | 715/770 |
| 2006/0022955 A1 | 2/2006 | Kennedy | |

(Continued)

FOREIGN PATENT DOCUMENTS

CN 1674007 A 9/2005

OTHER PUBLICATIONS

Marumushi.com article on Newsmap, printed on Dec. 8, 2006 retrieved from http://www.marumushi.com/apps/newsmap/.

(Continued)

*Primary Examiner* — Thanh Vu
(74) *Attorney, Agent, or Firm* — Kwan & Olynick LLP

(57) ABSTRACT

A method of filtering a web page or other computer file is provided. A web page is analyzed and segmented into regions or segments. At least one of the regions is selected for display. Selected regions are manipulated to enhance the visibility of preferred regions of the web page. In one embodiment, the manipulation comprises presenting the image of the page in accordance with a selected mathematical transform.

21 Claims, 14 Drawing Sheets

(56) References Cited

U.S. PATENT DOCUMENTS

2006/0277481 A1* 12/2006 Forstall et al. ............... 715/764
2007/0097109 A1   5/2007 Shoemaker et al.

OTHER PUBLICATIONS

Natasa Milic-Frayling et al., "Smart View and Searchmobil: Providing Overview and Detail n Handheld Browsing," Lecture Notes in Computer Science; Springer-Verlag, Berlin/Heidelberg; vol. 2954, pp. 158-171, Jan. 27, 2004. XP019002475.

Xinyi Yin et al., "Personalization of Web Content for Wireless Mobile Device," Wireless Communications and Networking Conference, 2004 IEEE Atlanta, GA, USA vol. 4 pp. 2569-2574. XP010708510.

Natasha Milic-Frayling et al., "SmartView: Flexible Viewing of Web Page Contents," Internet Citation URL: http://www2002.org/CDROM/poster/172/. XP002479611.

Natasha Milic-Frayling et al., "SmartView: Enhanced Document Viewer for Mobile Devices," Internet Citation URL: ftp://ftp.research.microsoft.com/pub/tr/tr-2002-114.pdf. XP002462835.

* cited by examiner

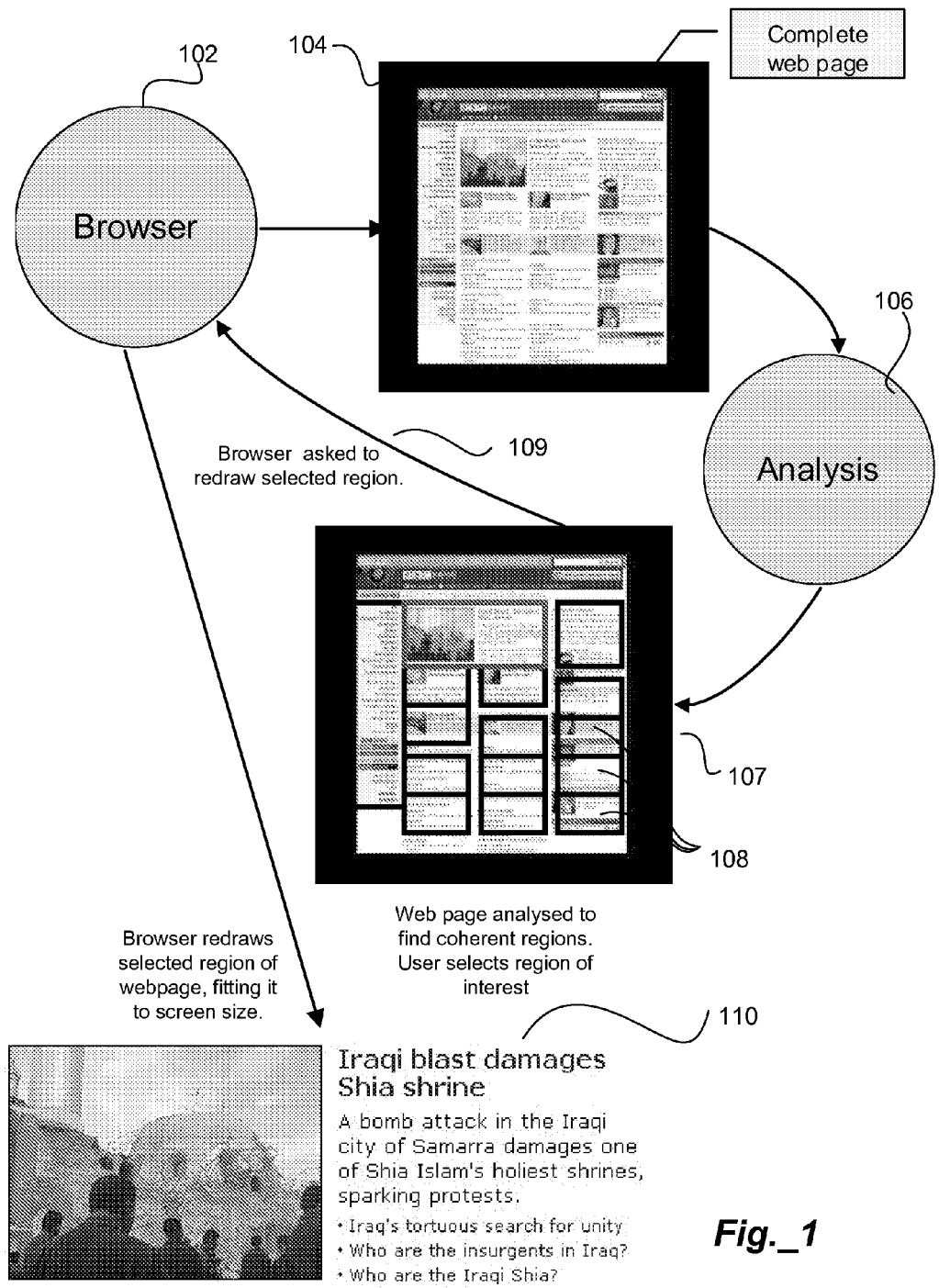
Fig._1

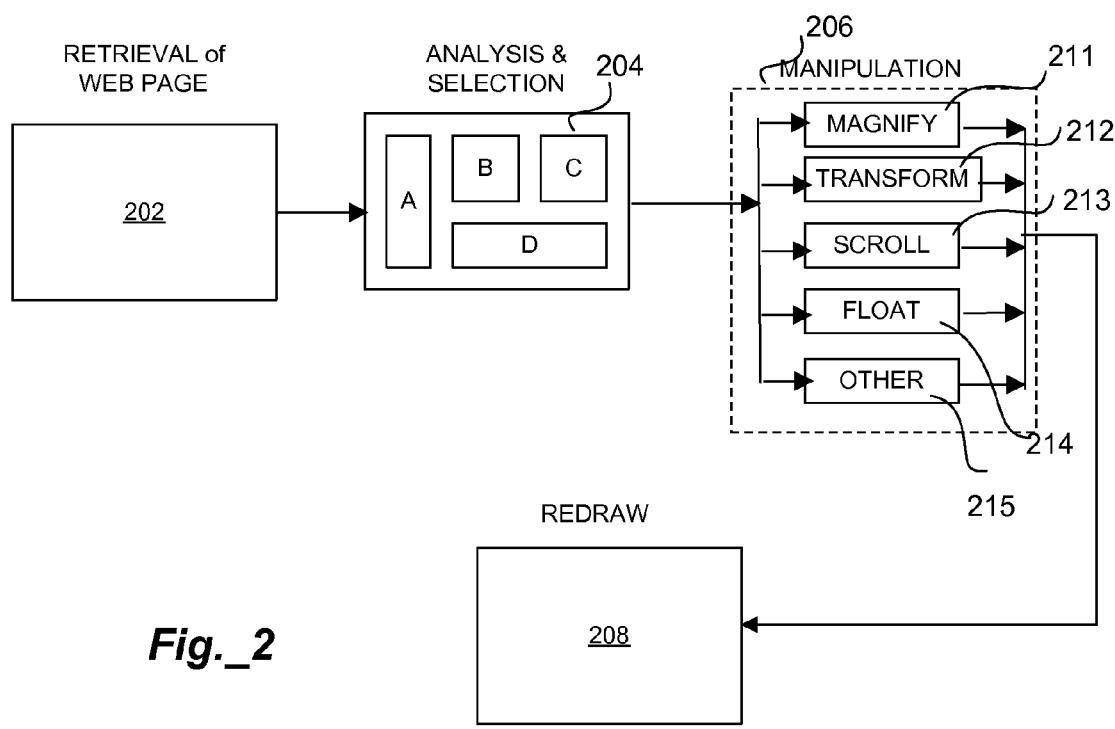
Fig. _2

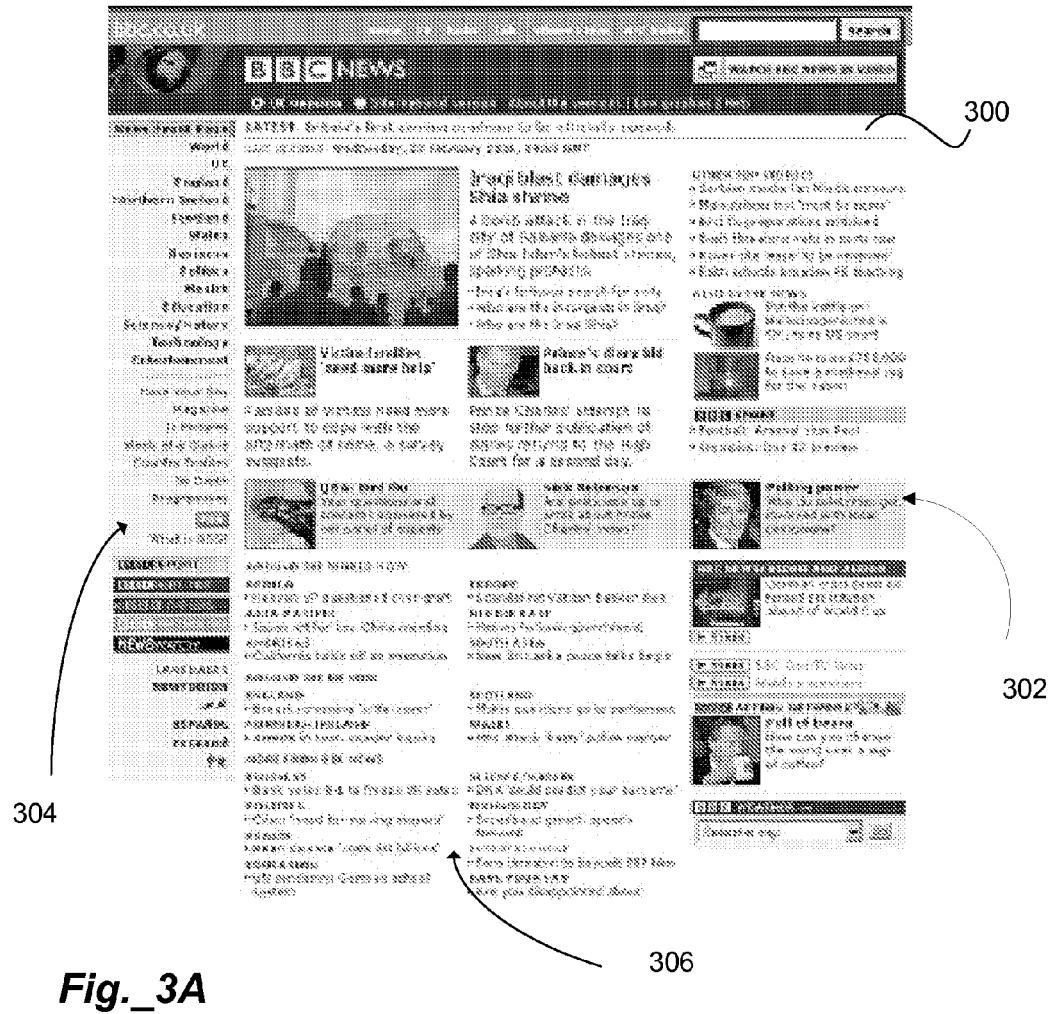
*Fig._3A*
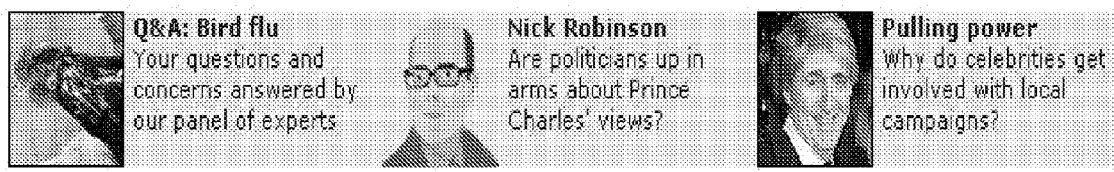
*Fig._3B*

News Front Page
World
UK
England
Northern Ireland
Scotland
Wales
Business
Politics
Health
Education
Science/Nature
Technology
Entertainment
—
Have Your Say
Magazine
In Pictures
Week at a Glance
Country Profiles
In Depth
Programmes What is RSS?
BBC SPORT
BBC WEATHER
BBC ON THIS DAY
NEWSWATCH
LANGUAGES
NEWYDDION
عربي
ESPAÑOL
РУССКИЙ
中文

AROUND THE WORLD NOW
AFRICA
▸ Kenyan VP questioned over graft
ASIA-PACIFIC
▸ Japan set for key China meeting
AMERICAS
▸ California holds off on execution AROUND THE UK NOW
ENGLAND
▸ Breast screening 'a life-saver'
NORTHERN IRELAND
▸ Arrests in town murder inquiry MORE FROM BBC NEWS
BUSINESS
▸ Bank votes 8-1 to freeze UK rates
POLITICS
▸ Cities 'need tax-raising mayors'
HEALTH
▸ Heart disease 'costs EU billions'
EDUCATION
▸ UN condemns German school system EUROPE
▸ Scandal-hit Vatican banker dies
MIDDLE EAST
▸ Hamas to form government
SOUTH ASIA
▸ New Sri Lanka peace talks begin SCOTLAND
▸ McKie questions go to parliament
WALES
▸ MPs attack 'hasty' police merger SCIENCE/NATURE
▸ DNA 'could predict your surname'
TECHNOLOGY
▸ Broadband growth speeds forward
ENTERTAINMENT
▸ Fans threaten to boycott 007 film
HAVE YOUR SAY
▸ Are you disappointed about 306b

*Fig._4A*
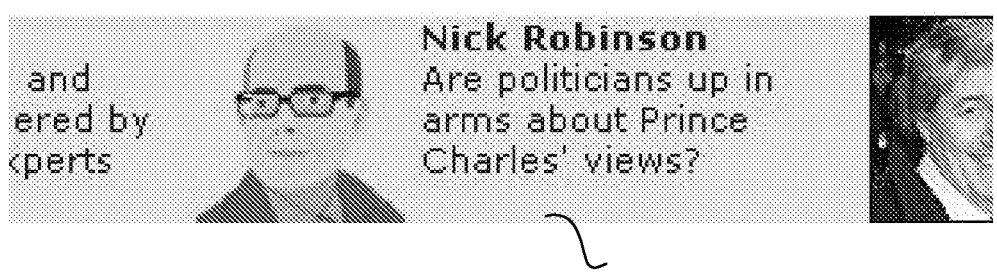
302b
*Fig._4B*

Fig. _5A
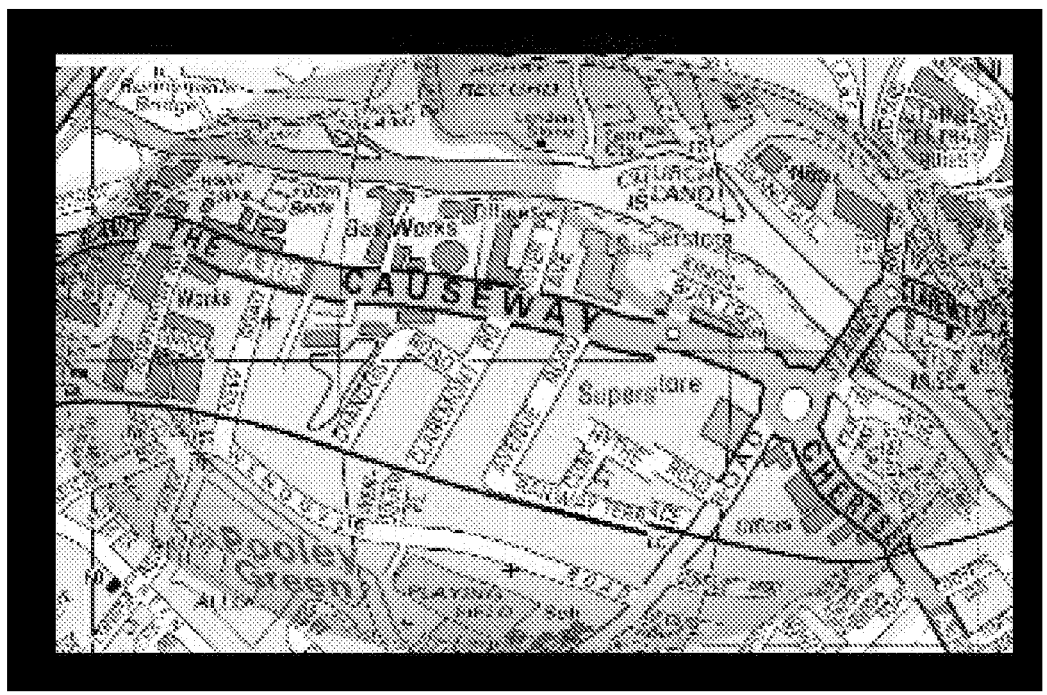
Fig. _5B

Fig._6A
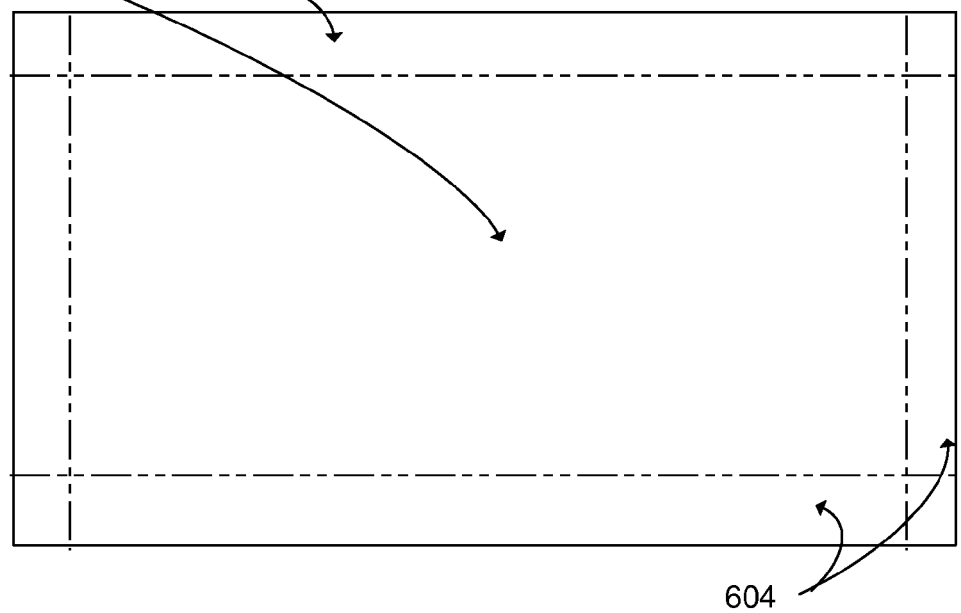
Fig._6B

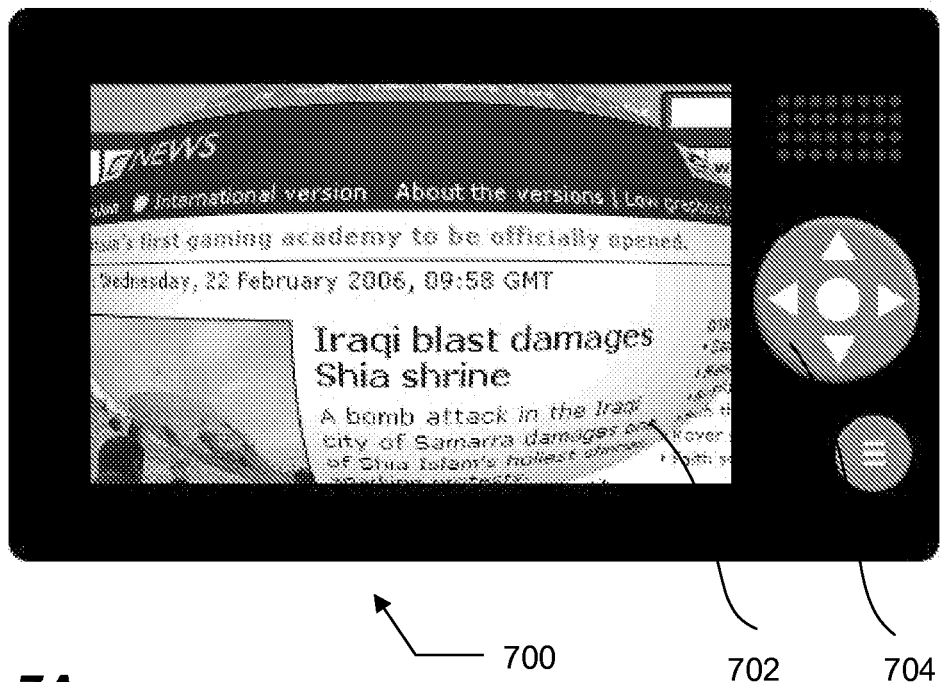
*Fig._7A*
*Fig._7B*

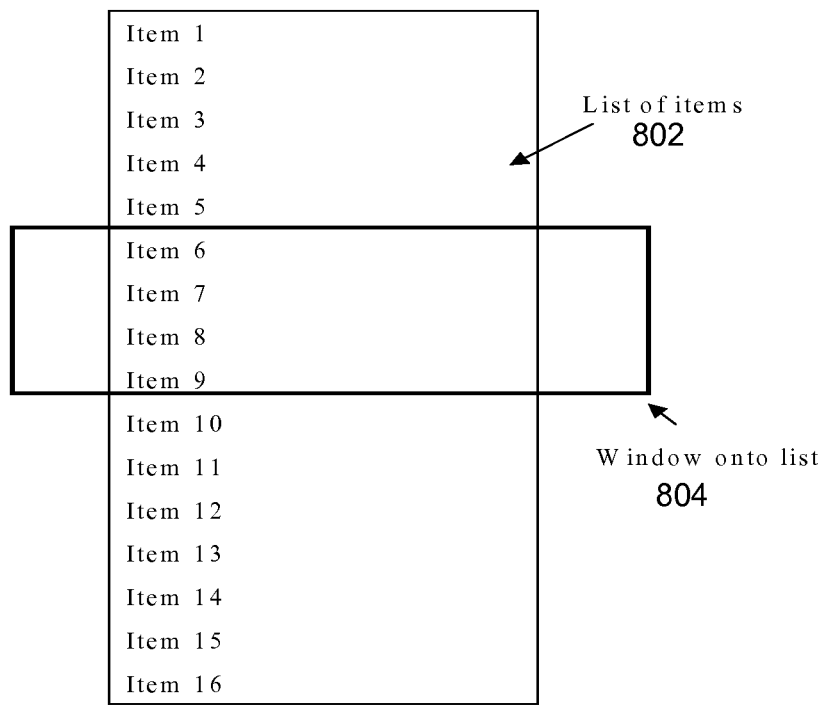
Fig._8

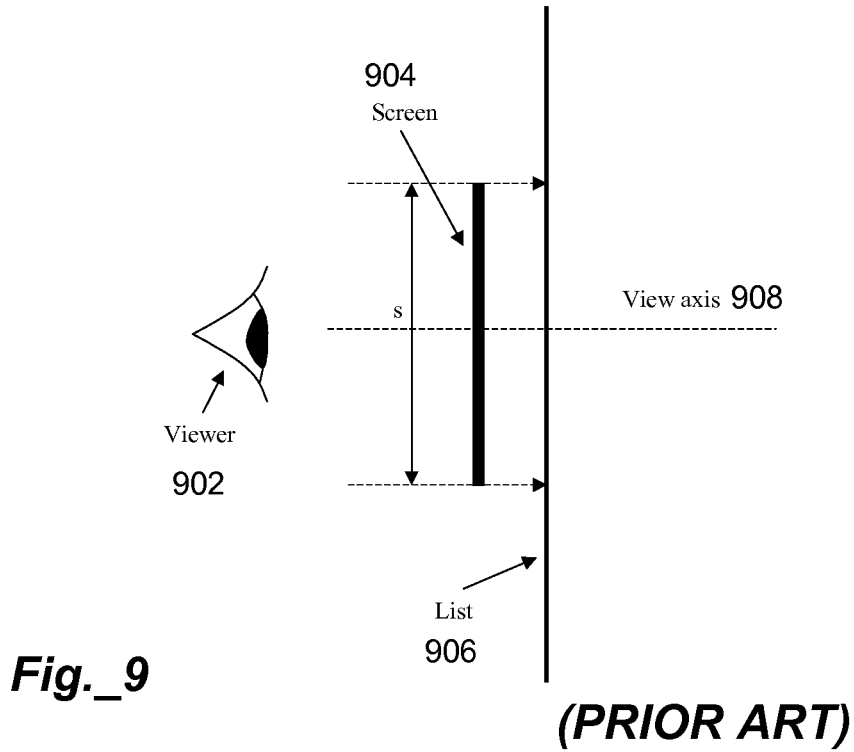
Fig._9 (PRIOR ART)
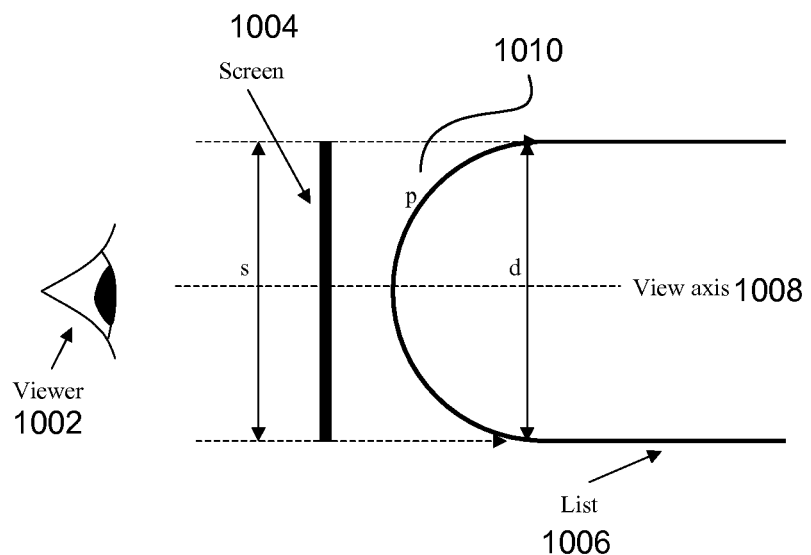
Fig._10

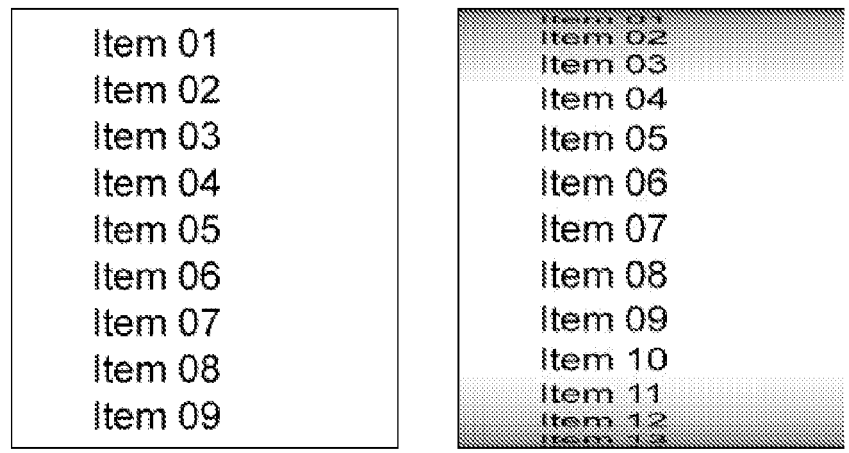
*Fig._11A*   *Fig._11B*
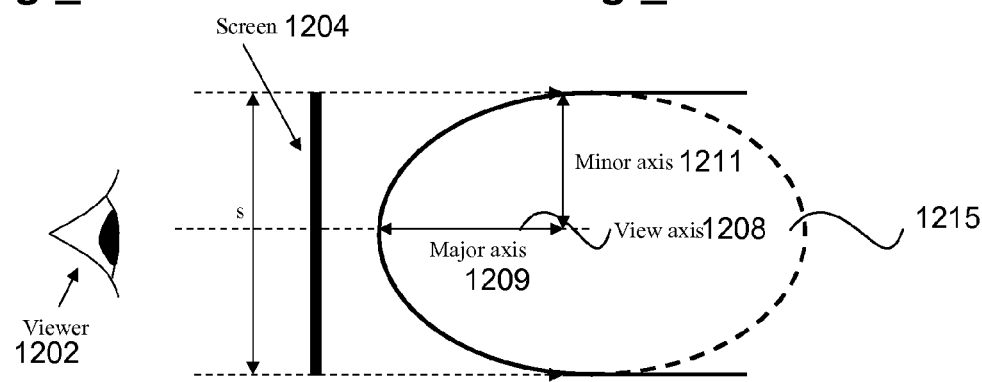
*Fig._12*
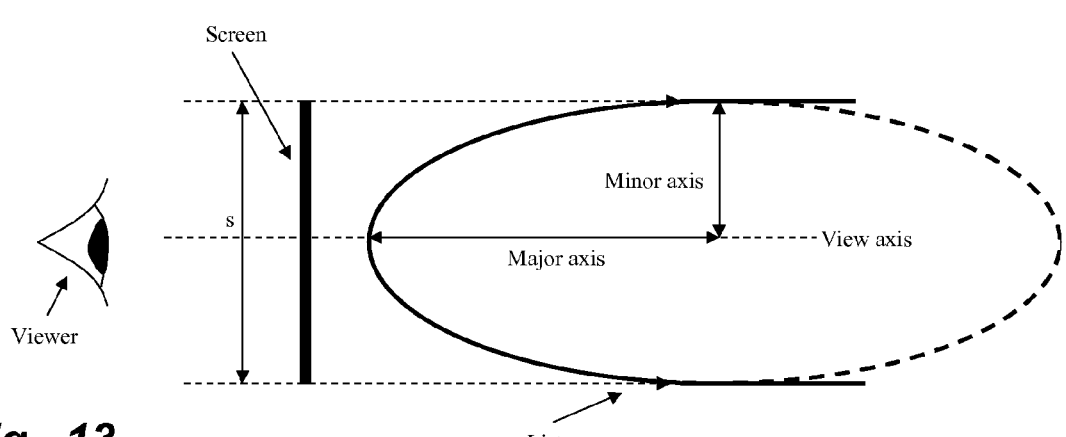
*Fig._13*

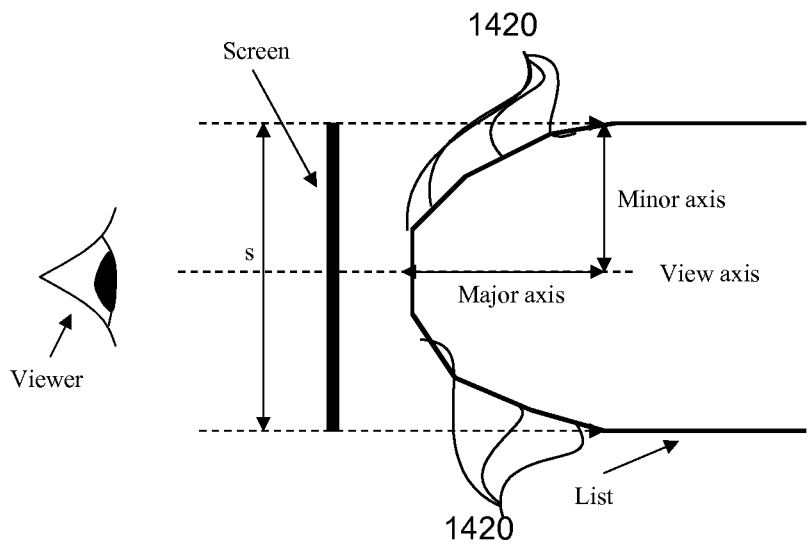
Fig._14
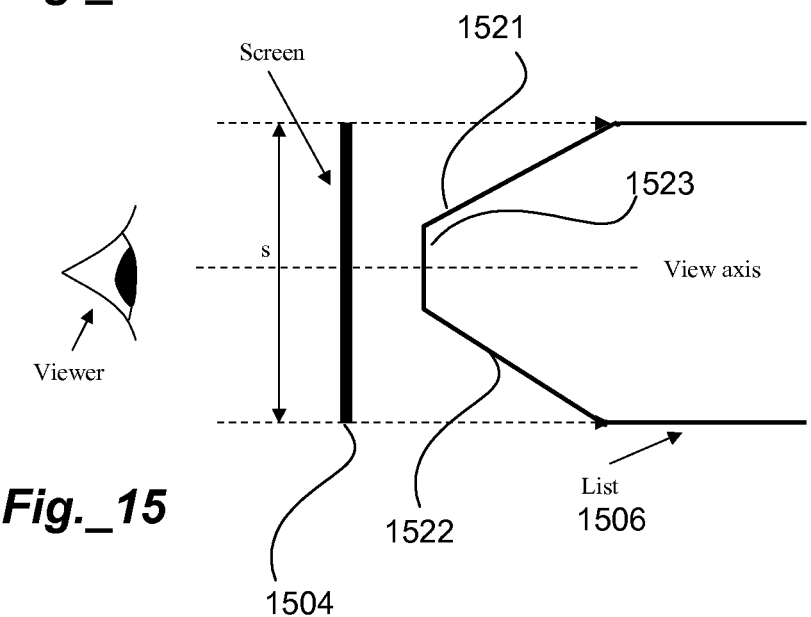
Fig._15

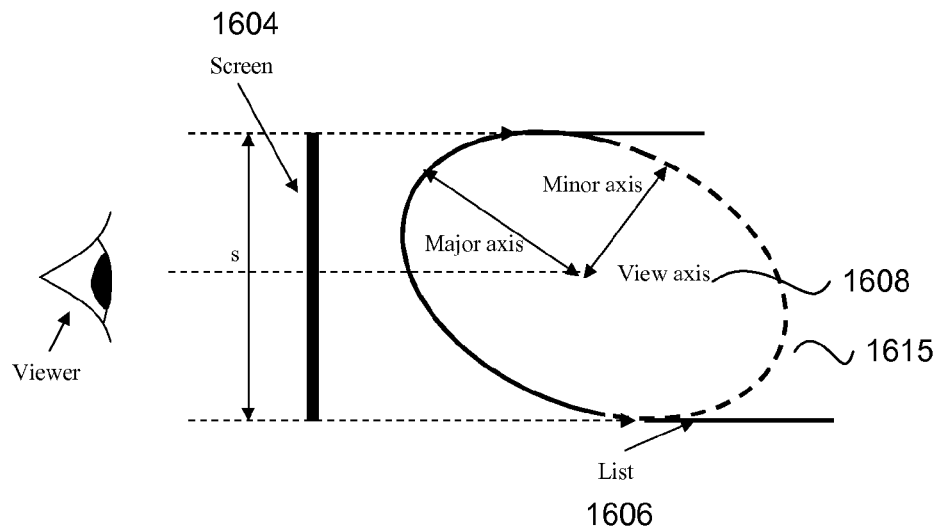
Fig._16
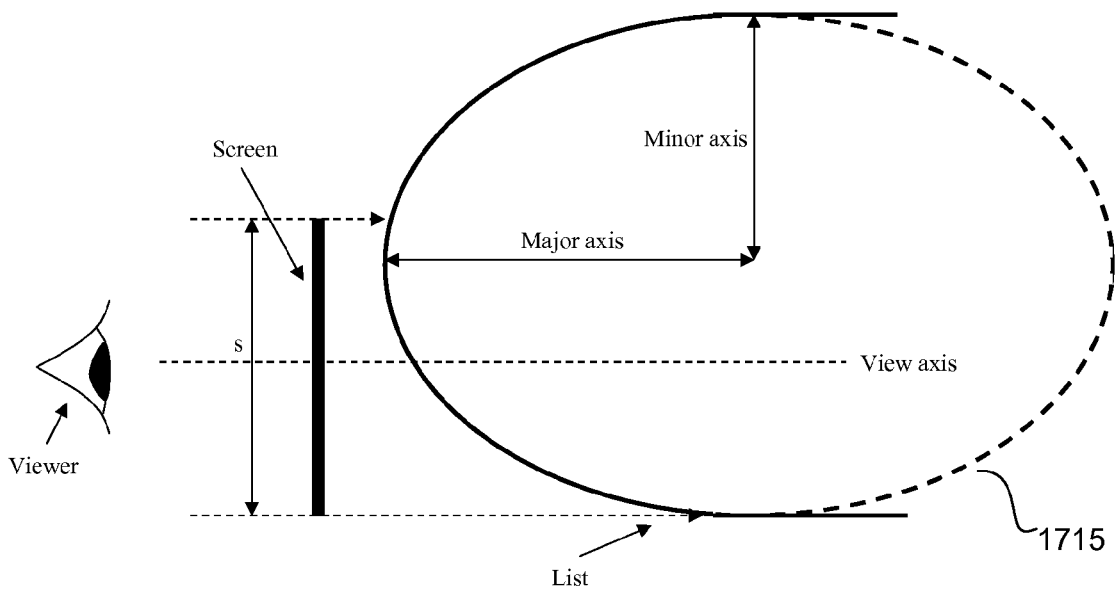
Fig._17

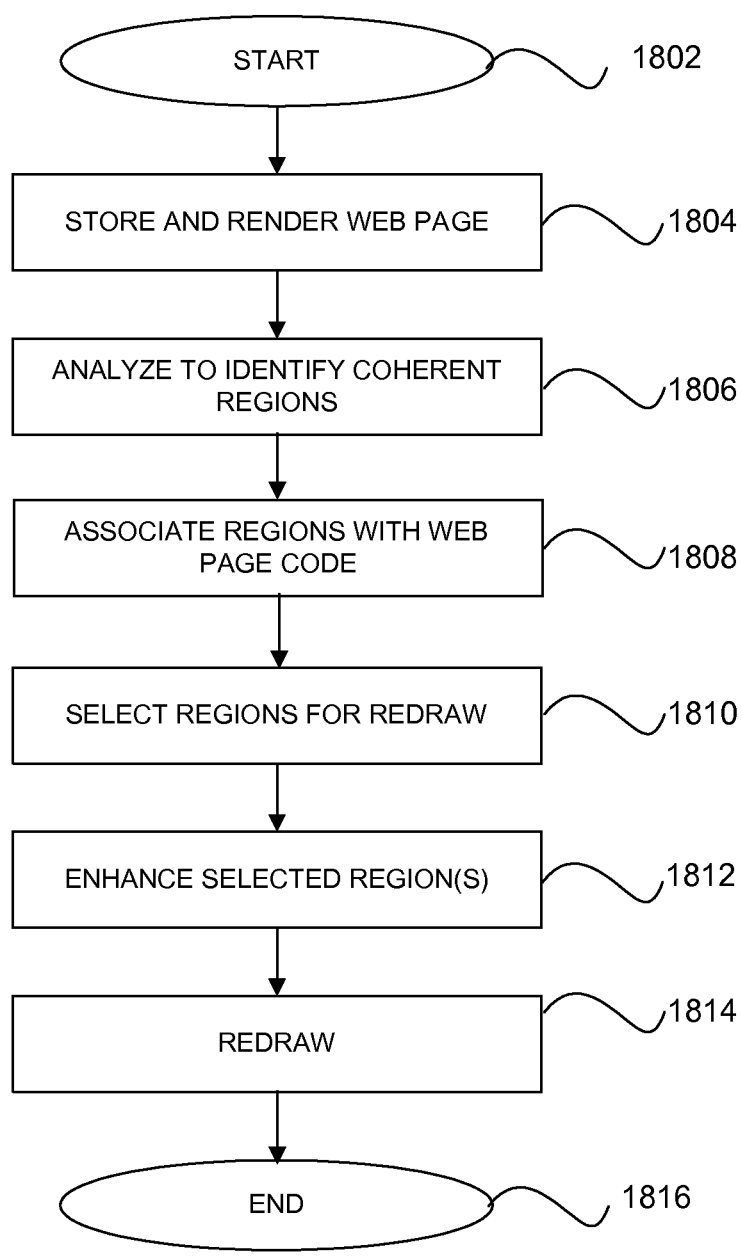
Fig._18

METHODS FOR MANIPULATING WEB PAGES

RELATED APPLICATIONS

This application claims the benefit of U.S. Provisional Application No. 60/597,534, entitled Graphical User Interface for Portable Devices, filed on Dec. 7, 2005, and U.S. Provisional Application No. 60/744,593, entitled Methods for Manipulating Web Pages, filed on Apr. 10, 2006, the specifications of which are incorporated herein by reference in their entirety.

BACKGROUND OF THE INVENTION

1. Field of the Invention

The present invention relates to displaying web pages. More particularly, the present invention relates to methods for modifying the display of web pages.

2. Description of the Related Art

Files containing text, graphics, and images are frequently accessed by users. For example, internet users frequently access web pages using browsers. A browser program typically interprets the markup language that codes images and text and presents the information in a user readable form. Unfortunately, the viewing experience is largely dictated by the formatting information of the source material. Although some browsers allow minor changes to be made by the user such as the size of the text font or the background colors, the creator of the source material largely dictates the presentation to the user. What is desired is an improved method for viewing text and images from web pages and other computer based files.

Displays for portable devices are often quite limited due to their emphasis on portability. Some portable digital entertainment devices may be used to carry music, photographs, video, electronic books, and other types of media. Increasingly, portable devices are being used to access the internet To be useful as a portable device they must be small, which in turn limits the size of screen they may use. The screen is often used to configure the device, and most importantly to enable user interaction with the device, for example, to select the next item to view or hear. While the size of screen is limited the storage in the device continues to increase. A typical device may store thousands of songs, which makes finding a specific one difficult and time consuming.

Further, displays on portable devices such as PDA's and cell phones are increasingly used to access various types of files, such as text and image files. For example, portable electronic devices used in audio player configurations are sometimes called upon to access details about a particular music track or collection of tracks. This information can include text about the artist, track or collection as well as images associated with them. In recent times cell phones have incorporated browsers for accessing internet pages (web pages) that present text and images. Unfortunately, the display screens on the portable devices are able to process and present to the user only a limited amount of text, image, and graphics information at one time, typically far less than available from web pages.

What is desired is an improved method of accessing web pages and other text and image files for presentation on display screens.

SUMMARY OF THE INVENTION

To achieve the foregoing, the present invention provides a method of presenting a web page in a more user-friendly configuration.

In accordance with one embodiment, a filtering method is provided for analyzing, manipulating, and presenting source material from a web page or other computer file to a user. A computer file, such as a web page, is retrieved. The page is analyzed by image processing techniques to identify at least one coherent region or segment. Each of the plurality of coherent segments is mapped to corresponding computer code segments for the web page. At least one of the plurality of segments is selected for the redrawing of the web page. The web page is then redrawn on the display screen to provide a filtered or reformatted representation of the original page.

In accordance with another embodiment, a method of modifying a presentation of a web page is provided. A rendered image representation is derived from markup language code such as HTML (hypertext markup language) for a web page. Using image-processing techniques, the rendered image representation is segmented into a plurality of segments. At least one of the plurality of segments is selected for a redrawn image and the web page is redrawn using the selected section.

In one embodiment, the display provides a listing to access media items in memory of the device or to a listing, text, or image derived from an identified region of a web page. The enhancement to the display provides a higher visibility of items in a focus area (i.e., a minimal distortion area) than items or details appearing in a context area of the displayed listing or region. In one variation, the list or region is projected onto an ellipse or faceted surface. In yet another embodiment, the minimum distortion zone is positioned off of the redrawn segment's center line to bias distortion in one direction or another. In another embodiment still, the distortion zone is dynamic, rotating up or down in accordance with a direction of a scroll or the speed of a scroll.

These and other features and advantages of the present invention are described below with reference to the drawings.

BRIEF DESCRIPTION OF THE DRAWINGS

FIG. 1 is a diagram illustrating a method of filtering a web page in accordance with one embodiment of the present invention.

FIG. 2 is a flow diagram illustrating diagram illustrating a method of filtering a web page in accordance with one embodiment of the present invention.

FIG. 3 is a diagram illustrating a full web page and the segmentation of the page into strips in accordance with one embodiment of the present invention.

FIGS. 4A and 4B are diagrams illustrating scrolling of magnified strips in accordance with one embodiment of the present invention.

FIGS. 5A and 5B are diagrams illustrating transformation by mathematical functions in accordance with one embodiment of the present invention.

FIGS. 6A and 6B are diagrams illustrating transformation by mathematical functions in accordance with one embodiment of the present invention.

FIGS. 7A and 7B illustrate another transformation technique in accordance with one embodiment of the present invention.

FIG. 8 is a diagram illustrating a conventional scrolled list.

FIG. 9 is a diagram illustrating a side view of a conventional display screen, viewer, and flattened list.

FIG. 10 is a diagram illustrating a side view of a display screen, viewer, and circular list in accordance with one embodiment of the present invention.

FIGS. 11A and 11B are diagrams illustrating respectively a flat list and a curved list in accordance with one embodiment of the present invention.

FIG. 12 is a diagram illustrating a side view of a viewer, display screen, and elliptical list in accordance with one embodiment of the present invention.

FIG. 13 is a diagram illustrating a side view of a viewer, display screen, and elliptical list with modified eccentricity in accordance with one embodiment of the present invention.

FIG. 14 is a diagram illustrating a side view of a viewer, display screen, and list having facets in accordance with one embodiment of the present invention.

FIG. 15 is a diagram illustrating a side view of a viewer, display screen, and list having three facets in accordance with one embodiment of the present invention.

FIG. 16 is a diagram illustrating a side view of a viewer, display screen, and rotated elliptical list in accordance with one embodiment of the present invention.

FIG. 17 is a diagram illustrating a side view of a viewer, display screen, and elliptical list increased in size in accordance with one embodiment of the present invention.

FIG. 18 is a flow chart illustrating a method of segmenting and enhancing a web page in accordance with one embodiment of the present invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

The present invention provides a method and system for filtering web pages. electronic text documents, or other computer files for presentation to a user. In accordance with a first embodiment, a web browser or other suitably configured software application retrieves a web page for viewing and filters it in order to provide a customized viewing experience for a user. That is, a web page containing markup language that describes the layout of various objects such as text, images, and graphics is received, analyzed to identify segments, and redrawn with at least one segment enhanced.

FIG. 1 is a diagram illustrating a method of filtering a web page in accordance with one embodiment of the present invention. Initially, a web page is downloaded and preferably cached in the device. More generally, a browser 102 retrieves a computer file potentially containing both text and graphics or images. Preferably the file is an HTML or other markup language file, such as might be accessed over a network as a web page. Throughout the specification, for illustrative purposes, the markup language code will be described as HTML. This example is not intended to be limiting, however. The scope of the various embodiments of the invention is intended to include the use of any form of markup language code or other descriptive languages for web pages without limitation. For example, handheld devices have utilized their own markup languages such as HDML (handheld device markup language) and WML (wireless markup language) and the methods described herein may be suitably used with pages coded in those languages.

The browser stores the web page preferably as a complete web page 104 as a preliminary step to further processing. Next, the browser translates or renders the html code corresponding to the complete web page to generate an image of the web page. Next, an analysis 106 is performed on the web page to identify coherent regions and preferably boundaries for those regions. In further detail, the analysis will preferably segment the web page into a collection 107 of coherent regions 108 in the web page.

Next, appropriate control signals are generated (109) instructing the browser to redraw one or more identified regions (segments). In order to redraw the web page, an association is made between the identified image segments and corresponding HTML code for the web page. This allows the browser to respond to reformatting commands on a region by region basis. The final step results in the browser providing to the display screen associated with the system at least one redrawn region 110. In this way, the redrawn region is presented to the user in a manner that may be more suitable to the user or the constraints of the display screen. For example, the display screen may be provided on a portable electronic device and hence limited in size. For small display screens, it may be difficult or impossible to present an entire web page in one display screen. The redrawn display screen in one instance may, for example, be limited to only one of the identified coherent regions and hence capable of displaying the content associated with that region in a legible text. In other instances, a plurality of regions or segments may be presented on the redrawn display screen, still with legibly sized text but without the associated images. In yet another embodiment, pluralities of regions having content of interest to a user are presented whereas regions having little or no interest for the user are filtered out, i.e., not displayed. It should be understood that these are examples of possible applications and are not intended to limit the scope of the present invention.

FIG. 2 is a flow diagram illustrating details of a method of filtering a web page in accordance with one embodiment of the present invention. Initially a complete web page 202 is retrieved and stored (cached) in a suitable memory buffer. Then, the cached web page is analyzed. Preferably, the analysis of the web page comprises the application of image processing techniques to segment a rendered image generated from the web page markup language.

In one embodiment, the web page is segmented or "divided" into strips for local device manipulation. As illustrated in block 204, the web page may be divided into vertical (204A), square (204B, 204C) and/or horizontal strips (204D). Preferably, image processing techniques are used to analyze the "drawn" page from the buffer, i.e., the rendered image of the cached page. The image analysis techniques are preferably performed on the stored image. The image corresponding to the intended web page (i.e., from the unaltered HTML code) need not be displayed at this point. Although the scope of the invention is not to be limited to analysis of the drawn page, analysis of the drawn page over other segmentation techniques is preferred. Web page descriptions are generally unstructured. That is, the structure is not apparent until the image is drawn. Designers often use standard visual methods to group items on a page. Hence, preferred analysis techniques use the standard visual methods to identify coherent regions in the web page. Without being limiting, the scope of the invention is intended to include identifying regions by common background color, blocks of text, the use of text headings, borders, and identifying images.

Next the user preferably makes a selection of one or more identified regions. Methods of making selections with respect to display screens, for example display screens appearing on the display of a personal computer or a handheld device, are known to those of skill in the relevant arts and hence full details will not be provided herein. Without intending to be limiting, the user can identify regions of interest on an interactive basis or the regions of interest may be selected and filtered automatically by the system's processor. In the former case, the user may click on a desired region with a mouse and cursor, other user input devices, or any suitable handheld device alternative.

Most web pages have "paid advertisements" that can be stripped off. Hence the processor can be configured to automatically identify advertisements and to strip them so that they don't appear in the filtered (redrawn) display screen. For example, paid advertisements are often consistent in their locations in a web page, particularly as associated with a single web page provider. This information can be used in analyzing different web pages from that provider. For a further example, paid advertisements often appear at the top of the web page and include to some degree images and key words or symbols (e.g., "$").

The automatic filtering in other embodiments may encompass user preferences provided by the user initially and perhaps updated at the user's prerogative. For example, the user may indicate his preferences by making selections in a user interface screen presented to the user of the personal computer or other electronic device. Such preferences are expected to be particularly useful in the exercise of parental control over the viewing habits of a child. For example, the system may be configured to filter "mature", violent, or other objectionable text or images from the redrawn web page.

In another embodiment, the processor is configured to automatically identify the user's web page usage habits. That is, the processor is configured to identify the user's preferences or typical regions of interest from the characteristics of the web page regions selected for further viewing in the redrawn display screen or, for example, the locations of those regions within those web pages. Conversely, the processor can be configured to "learn" the characteristics or locations of regions typically rejected by the user. Accordingly, a web page can be customized to the preferences provided by the user in a manual mode or as based on the user's history in identifying preferences on websites previously visited.

In accordance with another embodiment, a design template or page theme may be applied based on the user's frequency of visits to a site. For example, a frequently visited site could be interpreted as a recommended site and the content made available in the redrawn page would be designated as more extensive (e.g., including more regions) than less frequently visited sites.

After the analysis and selection of regions is completed, manipulation 206 of the one or more selected regions occurs. Various techniques for manipulation (enhancement) of the selected regions are available, including but not limited to magnification 211, transformation 212, scrolling 213, and floating 214. In one embodiment, both the selection of regions for the redrawn display screen and the presentation of those regions are adapted in such a way as to increase the number of items visible while retaining their visibility or legibility. In other embodiments, the selection and manipulation techniques are adapted to present a redrawn display screen more consistent with the user's preferences independently or in conjunction with considerations for increasing legibility of selected items.

Each selected strip, for example, any or all of 204A, 204B, 204C, and 204D may be magnified to increase their visibility. For example, when a single region is selected as in FIG. 1, the browser can magnify the selected region so that it fills the screen size. In other cases, for example when 2 or more regions are selected, their magnification depends on a sharing arrangement of the available screen space. Multiple manipulations may be applied to a region. For example, both magnification 211 and scroll 213 may be applied. Though not limited to the described application, this technique is expected to be particularly useful on small device screens. For example, in one embodiment, each strip is magnified and also set with a scrolling speed so that the "menu" within the strip is scrolled automatically on the small device screen.

A selected region or strip may be transformed 212 by other mathematical functions. For example, as illustrated in FIG. 5A, the strip or segment may be spherized. This type of transform, when applied to a map, is expected to be especially useful to the user, for example, to provide balance between a "focus" area of an image and a context area.

Floating 214 is a technique whereby the information may appear over a different region of the web page and moved in accordance with the user input. This is expected to be especially useful for "menu" items, such as a listing that allows the user to hyperlink to other HTML files (web pages). "Other" manipulation techniques 215 include the application of shading or other effects. Shading can make a page appear as a 3-Dimensional object (such as a map displayed on a globe) and help the user differentiate between focus information at the center of the display and peripheral information provided to help the user appreciate the position of the displayed information in relation to the entire (i.e., original) web page. That is, the shading as well as the other transformation and manipulation techniques are expected to help the user with placement of the information in the "context" of the page.

Finally, the filtered web page or file is redrawn 208.

Generalizing, the various strips, which can be defined to be infinite shapes and sizes, can be attached with a time element for either being still or moving. The strips can also be applied with the various mathematical functions for different presentations Filtering a stored web page that allows the user to delete certain segments from a redrawn (filtered) page provides better readability and easier access. Often, the menu on a web page is on the left, as one reads the article, one scrolls the page down. On a large enough display, to move to a menu on a left side with a mouse is easy but on a small device with a small LCD, it is more of a challenge. If the menu can be recalled easily as an independent strip and scrolled independently, it gives the user a faster response and better navigation. This embodiment is useful for all sizes of displays. Additionally, it works well for users accustomed to portable device user interfaces that incorporate menus or listings to access the functionality of the portable device. For example, PDA's (portable digital assistants), portable media players, and other handheld devices commonly integrate full screen listings in their menu functions. Filtering can be used to remove unwanted segments. Most web pages have "paid advertisements" in them that can be "stripped" off in accordance with the technique of embodiments of the present invention.

FIG. 3 is a diagram illustrating a full web page and the segmentation of the page into regions or strips in accordance with one embodiment of the present invention. As illustrated in FIG. 3A, a full web page 300 having a plurality of "regions" 302, 304, and 306 is presented. By using the techniques of the present invention, the regions may be independently presented and subjected to appropriate manipulation techniques as illustrated in FIG. 2. FIG. 3B illustrate region 302 magnified to increases its visibility. FIG. 3C illustrates the magnification of menu 304, again with increased visibility. FIG. 3D illustrates region 306 magnified to increase its visibility. It should be noted that the news menu 304 illustrated in FIG. 3C is in fact a listing of links. For example, in some browsers, using an input device to move a cursor over the listing item displays a URL for the link. Clicking on the link causes the browser to access the file (web page) associated with the link.

Scrolling is one manipulation technique applicable to any of the regions presented on the redrawn display, or even the entire filtered display screen. FIG. 4 illustrates a scrolling manipulation technique in accordance with embodiments of the present invention. FIG. 4A illustrates menu 304 as scrolled, for example, to accommodate a limited screen height in a portable electronics device. Preferably, a time parameter may be selected and associated with the strip to allow the strip to be perceived as moving or static. FIG. 4A shows a static strip. The different portions of the strip may become visible through appropriate user input. For example, the user may move a scroll wheel on a mouse to cause the contents of the strip to move up or down. In a dynamic mode the user can select a speed from a menu, such as a pop up menu, for the automatic movement of the strip. In the latter embodiment, the system is configured such that the contents of the strip continually rotate to become visible to the user. FIG. 4B illustrates a horizontal strip 302b representing region 302. As illustrated, only a portion of the full strip 302 is visible. The full contents can be accessed on a manual basis, through a scroll wheel, arrow keys (to scroll up, down, left, and/or right), or other suitable user input device as known to those of skill in the relevant arts. Alternatively, the scrolling may occur automatically at a pace determined by user preference or the type of material to be displayed within the strip or both. For example, a menu containing a list of items may be set to scroll more quickly than a block of text for reading, such as a news article.

The rendered images of the selected regions may also be enhanced for presentation to the user in accordance with embodiments of the present invention.

FIGS. 5A and 5B are diagrams illustrating transformation by mathematical functions in accordance with one embodiment of the present invention. FIG. 5A illustrates a spherized transformation 306c of the content represented by region 306. This transformation technique resembles the effect of a magnifying glass with improvements over a typical magnifying glass rendition for a portion of a page. The transformation is conceptually equivalent to taking a flat web page that is parallel to the screen, placing a sphere behind it and pushing the sphere through the page towards the eye of the user. The page is distorted in the middle and effectively magnified while the background stays flat. This description is illustrative and not limiting. For example, one of the perpendicular axes may be larger than the other to accommodate the non-square shape of the selected region or strip, as illustrated in FIG. 5A. In this case, the magnified transformed portion is not a true sphere but rather an oblate spheroid.

FIG. 5B illustrates the application of the same transformation to a map. Due to the parameters selected, there isn't much magnification of the page in the middle compared to the edges, but you see more because the parts that map to the edge of the sphere get compressed. This transformation has the advantage that the center can be read easily, the edges adequately, but the middle ground, i.e., near the edges of the sphere, not as well. This is different from a normal magnifier because the effect includes compression of some parts of the screen coupled with enlargement of others. Visual artifacts (e.g., loss of content) caused by the sharp cutoff at the edge of a magnifying glass are thus avoided.

In another embodiment, user selectable radius and offset parameters provide variations in the display screen presentation. Setting the radius to a small value with a larger offset (i.e., pushing the sphere a long way through the page) provides very steep sides. A big radius with a small offset gives gentle edges and less compression. If the edges are made too steep visibility of some of the page may suffer. In one embodiment, a medium setting for the offset is selected to avoid "jagged" artifacts originating around the edge of the sphere at the sharp junction between the sphere and the plane representing the rest of the page or map.

FIGS. 6A and 6B are diagrams illustrating transformation by mathematical functions in accordance with one embodiment of the present invention. FIG. 6A illustrates a transformation wherein the periphery 604 of the page 600 is compressed while the central portion 602 of the page image is in a normal size or enlarged. FIG. 6B illustrates the page 600 with the central portion 602 and periphery 604 identified without the image and text for clarity of illustration. This transformation technique provides a visible and legible area 602, for example suitable for reading. It also provides a periphery region that is compressed and not easily readable. However, the periphery region 602 provides some context to help the user identify where he is within the web page. Preferably, the user is given manual scrolling control to scroll the page both vertically and horizontally. Though illustrated here for scrolling the entire web page, the scrolling techniques describes (i.e., both up-down and left-right) are equally applicable to the strips or regions described earlier in this specification.

FIGS. 7A and 7B illustrate another transformation technique in accordance with one embodiment of the present invention. FIG. 7A illustrates a mathematical transform applied to the web page on a portable device to enlarge a region of the page relative to a periphery region. The portable device 700 includes a display screen 702 and a user input device 704 that allows the user to scroll a displayed portion of a page left right as well as up down. The scope of the invention is intended to apply to any transform, including but not limited to those that simulate that the center portion of the page protrudes form the page or is recessed into the page. Example non-limiting embodiments include the application of a convex transform and a concave transform. FIG. 7B further illustrates the effect of shading to simulate that the page shown is three-dimensional.

These manipulation and transformation techniques are intended to be illustrative and not limiting. Preferably, the manipulation techniques are performed on a region-by-region basis. That is, a first region may be modified by any manipulation technique and a second region modified by any of the available manipulation techniques. This provides greater visibility choices for the user.

FIG. 18 is a flow chart illustrating a method of segmenting and enhancing a web page in accordance with one embodiment of the present invention. The process commences at operation 1802. Next, the web page is retrieved, stored and rendered at operation 1804. Here the contents of the computer code corresponding to the web page are translated to prepare an image corresponding to the markup language or other computer code identified with the web page.

Next, in operation 1806, the rendered image corresponding to the web page's computer code is analyzed, preferably by image processing techniques, to identify coherent regions. That is, the image analysis will generate a collection of coherent regions corresponding to the web page. Next, in operation 1808 each of the identified regions is associated with the corresponding markup language code needed for redrawing that region. It should be understood that associating the original web page markup language (e.g., HTML code) with each identified region isn't necessary in all embodiments. That is, images corresponding to the identified regions can be identified, manipulated (enhanced in some fashion) and redrawn without resorting to the HTML code. However, associating the code with the identified regions provides several advantages, including allowing interactive linking to other web pages and more options in the presentation of text and images. For example, in several embodiments, text may be reformatted to fit a narrow window to avoid the user scrolling left and right.

In order to present a customized web page, at least one region is selected to be redrawn in operation 1810. Selection of regions to be redrawn can be a form of filtering in itself. For example, a page analyzed to identify coherent regions may result in 10 separate regions. In cases where a full sized screen is available, perhaps 8 or 9 of those regions may be selected for presentation in the redrawn display if one or several of those regions is deemed to be undesirable. With smaller display screens the selection of regions will lie at or close to a single region or a minimum number of regions due to the size constraints and visibility tradeoffs. Hence in application, the selection may be motivated by a desire for visibility of regions and in others to filter objectionable material.

Next, in operation 1812 the selected region or regions are enhanced. Enhancement may take a variety of forms including but not limited to repositioning the identified regions relative to the neighboring regions, manipulating the size of the regions (e.g., magnification or reduction), effectuating time elements for the contents associated with the identified regions (e.g., scrolling), and reshaping the regions. Specific non-limiting examples of enhancements that may be applied to identified regions include manual scroll vertical, manual scroll horizontal, manual scroll in both vertical and horizontal directions, automatic scroll vertical, automatic scroll horizontal, magnification, reduction, combined magnification and reduction to a region, segregating a region into focus and context regions using non-linear transforms, application of spherization to a region, and application of new color templates to text and graphics in one or more regions. When multiple regions are selected for the redrawn display, enhancements are preferably applied independently to the different regions. That is, for example, one region may be scrolled whereas another may be enlarged while still another will have its shape modified.

Next, in operation 1814 the identified regions are redrawn, preferably by a browser configured to translate or render the markup language as enhanced. In a preferred embodiment, the markup language corresponding to the selected enhanced regions is modified, thereby allowing the use of a standard browser. In this way, a web page is tailored for both the user's interests and the limitations of the device displaying the web page. The process ends at operation 1816.

The following embodiments describe a portable device configured to enhance web pages as well as to enhance the display of control menus, media content, and other listings related to non web page functionality of the device. Generally, in the following embodiments, the description refers to a method of increasing the effective screen area of portable digital entertainment devices such that more items in a list of items may be viewed on a limited size display screen. It should be understood that these enhancement techniques are not only useful for enhancing the presentation of control menus and media item listings from the portable players' media libraries but also work well for enhancing the selected regions or segments from a web page. Accordingly, embodiments of the present invention enhance the presentation of the identified coherent segments by performing the transformations described below to identified coherent regions of web pages. For illustrative purposes, the listings in the embodiments below describe generally content items. These are not to be construed as limiting the scope of the invention to media content items. The scope of the invention includes without limitation listings of all types and images. In other words, the enhancement techniques described below apply as well to lines of text from a web page, listings of links (hyperlinks), graphics, and images, without intending to limit the scope of the invention to the enumerated items.

In one embodiment, the display provides a listing to access media items in memory of the device or to a listing, text, or image derived from an identified region of a web page. The enhancement to the display provides a higher visibility of items in a focus area (i.e., a minimal distortion area) than items or details appearing in a context area of the displayed listing or region. In one variation, the list or region is projected onto an ellipse or faceted surface. In yet another embodiment, the minimum distortion zone is positioned off of the viewer's centerline to bias distortion in one direction or another. In another embodiment still, the distortion zone is dynamic, rotating up or down in accordance with a direction of a scroll or the speed of a scroll. In yet another embodiment, the enhancement of at least one identified region comprises includes altering the degree of the ellipse or the curvature simulated by the faceted surface to match the speed of the user's manual scroll or alternatively, the automatic scroll speed.

In one embodiment, provided is a means of displaying a list of items on a screen in such a way as to increase the number of items visible while retaining their visibility. Although the list of items may be long, only a section of the list is visible on the screen at any time. If the list is visualized as being on a flat piece of paper that is pulled behind a window, see FIG. 8, the view through the window 804 represents what will be seen on the screen. FIG. 8 illustrates a scrolling list 802 that can be considered to be a long piece of paper with items on it, being pulled beneath a window. According to a conventional method, the number of items that may be seen at any time is determined by dividing the height of the screen by the height of the items making up the list. This representation of the list is termed flat, and is the standard method of display as shown in FIG. 9.

FIG. 9 illustrates in side projection a representation of the viewer 902, screen 904, and flat list 906. The viewer looks along the view axis 908 at the screen that displays a section of the list. The screen may be thought of as a window onto part of the list.

If the paper list is now visualized as being wrapped around a curved object, where the diameter of curvature of the object is similar to the height of the screen, a different view of the list is obtained. The curvature of the list results in items at the top and bottom of the window occupying a smaller amount of the screen than those near the center. The curvature of the list can be depicted as following any surface, such as included a circular or elliptical surface. In one embodiment, shown in FIG. 10, the curvature of the list follows a circle.

FIG. 10 illustrates a side projection of a representation of the viewer 1002, screen 1012, and circular list 1006. The viewer looks along the view axis 1008 at the screen 1004 that displays a section of the list. The list is bent into a circular shape that increases the size of its perimeter relative to the height of the screen. The curved list is projected onto the screen 1004 resulting in the non-linear warp of the visible region of the list.

The figure represents a side view showing the viewer, the screen on which the list is displayed, and the apparent curvature of the list as though seen through the screen. The perimeter 1010 of the semicircle visible through the screen is given by:

$$p = s * \pi / 2$$

where s is the height of the screen 1012. By wrapping the list around a circle with a diameter d equal to the height of the screen, the amount of the list visible through the window 1012 is π/2 (or approximately 1.5) times greater than the flat representation. When viewed through the window, or on the screen, the list appears to be flat but with more items visible on it. If a shading effect is added the curved lists appears three-dimensional and adds to illusion to that the list really does curve away.

FIG. 11 compares a flat list with a curved list. Items 1 to 9 may be seen on the flat list FIG. 11A while items 1 to 13 may be seen on the curved list FIG. 11B, which is nearly 1.5 times more. The shading on the curved list makes it appear three-dimensional. Suitable shading may be calculated by approximating a lighting effect with Lambert's cosine law:

$$i = k \cos(\theta)$$

where i is the intensity of the shading, k is a constant, and θ is the angle between the surface normal and the direction of illumination. More details may be found in reference: Computer Graphics, James D. Foley, Andries van Dam, Steven K. Feiner, John F. Hughes; Addison-Wesley Professional; 2 edition (Aug. 4, 1995).

Clearly the actual screen space has not increased, but an accurate projection of the curved surface onto the screen as shown in FIG. 11B results in a warping of the image that increases the number of items visible in a manner pleasing and natural to the eye. The warp applied is non-linear because it changes along the scrolling axis, making items closer to the edge of the screen smaller than those at the center; the width of the items (assuming vertical scrolling) is largely unaffected by the warp because if it is warped it becomes difficult to read. It should be noted that this effect is not limited to either manual or automatically scrolled screens. The same effect can be advantageous in presenting a listing of links, text such as in a news article, or even to an image. In the latter case, the pixels displayed near the top or bottom will show more compression than those in the center.

In the general case the display process consists of rendering a flat list and then warping it according to the desired curvature. Filtering should be applied during the warp to reduce aliasing artifacts caused by some information being discarded. The high frequency content of text makes it particularly susceptible to aliasing. The filtering may be restricted to the axis along which the warp is applied. Suitable filters include bilinear, cubic, or higher order filters; more details may be found in the reference: Reconstruction Filters in Computer Graphics; Mitchell, Netravalt; Computer Graphics Vol. 22, Number 4, August 1988. It is also possible to combine the two stages of rendering and warping into one step in which case the list items are rendered in their warped form. This alternative approach has the benefit of reducing the number of separate stages needed to complete the display, but complicates the rendering operation.

Warping the list as to make it appear to be wrapped around a curved surface not only makes more items visible, but also gives scrolling the natural appearance of rotating through the display. When a scroll is triggered it is possible to simply move the next item into position immediately but a more pleasant effect is seen by smoothly sliding the list across the curved surface.

In another embodiment the curvature of the list follows the shape of an ellipse. An ellipse may be defined in terms of a major and minor axis as shown in FIG. 12. In particular, FIG. 12 illustrates a side projection of a representation of the viewer 1202, screen 1204, and elliptical list 1206. The viewer 1202 looks along the view axis 1208 at the screen 1204 that displays a section of the list. The list 1206 is bent around an ellipse that increases the size of its perimeter relative to a circle, and therefore the number of items visible. If both the major and minor axes (1209, 1211) are the same length the shape is circular. As the major axis 1209 becomes longer than the minor axis 1211 the eccentricity of the ellipse 1215 increases; as the eccentricity increases the perimeter of the ellipse 1215 visible on the screen 1204 increases, so the number of visible items also increases (see FIG. 13.) FIG. 13 illustrates in particular that as the eccentricity of the ellipse increases, its perimeter also increases making more of the list visible.

The circumference or perimeter of an ellipse is difficult to calculate precisely but a useful approximation is:

$$p \approx \pi \sqrt{\{2(a^2+b^2)-(a-b)^2/2\}}$$

where p is the perimeter, a is the major axis, and b is the minor axis. Therefore the increase in apparent screen space given as a ratio of apparent screen height to actual screen height is:

$$\text{Screen height ratio} \approx \pi \sqrt{\{2(a^2 + (s/2)^2) - (a - (s/2))^2 / 2\}} \Big/ 2$$

where s is the screen height. Where for a circle the ratio is 1.57, for an ellipse with the major axis double the minor axis the ratio is 2.42, meaning that 2.42 times as many items may be displayed on this shape of ellipse as a on a flat representation. But despite the increase in the number of items visible, the size of the center item is largely unchanged and so easily identified. As items are placed further from the viewing axis they suffer increasing distortion and are increasingly difficult to identify.

In another embodiment the smooth curve of the circle or ellipse may be replaced by facets representing a piecewise approximation of the curve such as the one shown in FIG. 14. As the facets 1420 become larger the curve ceases to appear smooth, but the same benefits of apparently increased screen space remain. In the extreme the curve may be reduced to just three facets, shown in FIG. 15, where a warping effect may be applied to the upper and lower faces (1521, 1522) making the items smaller towards the top and bottom of the screen 1504, while the items on the center face 1523 remain approximately the correct size. In summary, FIG. 14 illustrates that the curved surface may be represented by facets instead of a continuous curve. FIG. 15 illustrates a similar effect that may be reproduced on only three facets.

Those skilled in the art will recognize that the diameter of curvature does not need to match the height of the screen, and that a flatter curvature will be seen if the diameter is greater than the screen height with less distortion at the edges. In other embodiments curves other than an ellipse are used as the basis for warping the image.

In a preferred embodiment as described and illustrated in FIGS. 10-15, the items displayed at the center of the screen have minimum distortion to keep them most clearly visible. In another embodiment minimum distortion may be placed off the center line in order to bias the distortion in one direction or another.

FIG. 16 illustrates that the ellipse 1615 may be rotated away from the view axis 1608. FIG. 169 shows an ellipse 1615 rotated to position the minimum distortion towards the top of the display screen 1604. If the list 1606 is being scrolled upwards rotating the ellipse 1615 towards the top as shown maximizes the number of items visible below it, which can give advance warning of an approaching target item. The rotation of the curve may be fixed by the design of the user interface, or may be dynamic, rotating up or down according to the direction and speed of the scroll. In a further embodiment, the degree of curvature of the list 1606 may be linked to the speed of scrolling. For example, a faster scroll may cause the curvature to increase to make more items visible.

In another embodiment the diameter of the curve may be greater than the size of the screen, but the center of the curve is shifted away from the center of the screen. A large ellipse may be offset from the view axis to give more warning of items being scrolled into view. FIG. 17 shows a large ellipse 1715 that has been shifted so that the undistorted region is near the top of the screen 1704. This arrangement may be appropriate for lists that are scrolled up the screen as it gives maximum visibility to those items appearing at the bottom of the screen. The offset of the curve from the center may be affected by the direction and speed of scrolling.

The embodiments above have all described vertical scrolling of a list of items. Those skilled in the art will recognize that the same techniques may be applied to horizontal scrolling of lists, and that the lists may contain, without limitation, links such as hypertext links, text including names, images including photographs, and control menu options.

It is to be appreciated that the scope of the invention is to include other apparatus and techniques for displaying items within a listing. For illustration purposes the listing of items have generally described a listing of text items. The scope of the invention is intended to extend to any content associated with the text items, including but not limited to audio files, video files, other media files, and control items such as menu options accessible through the user interface. In particular, the text items relating to audio files can include titles, artists, genres, albums, or any other metadata used to navigate to tracks, such as particularly but not exclusively those content items accessed in a portable media player, such as an audio MP3 player having a plurality of tracks stored or accessible from the player. Further, the scope is intended to extend to at least the same content items represented in the listing by icons or other non textual identification means.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of modifying a presentation of a web page, the method comprising:
receiving a web page;
analyzing an image of the web page to segment and identify a plurality of coherent regions from the image of the web page, wherein analyzing the image of the web page comprises using an image processing technique to segment and identify the plurality of coherent regions from the image of the web page; and
automatically selecting, by a processor, a first coherent region of the plurality of coherent regions to be redrawn for presentation on a display screen and filtering out a second coherent region entirely, wherein automatically selecting the first coherent region includes automatically identifying a user's web page usage habits, wherein the processor is configured to learn characteristics and locations of regions typically rejected by the user.

2. The method as recited in claim 1 further comprising enhancing at least one of the plurality of regions in redrawing the web page.

3. The method as recited in claim 1 further comprising mapping each of the plurality of coherent regions to corresponding markup language code portions for the web page.

4. The method as recited in claim 3 further comprising presenting a redrawn web page using a browser to render the markup language code for a plurality of identified regions.

5. The method as recited in claim 4 wherein at least one of the plurality of regions is enhanced when redrawn.

6. The method as recited in claim 5 wherein the enhancement comprises presenting a first portion of the data corresponding to the region sequentially in time in relation to a second portion of the data corresponding to the region.

7. The method as recited in claim 6 wherein the presenting comprises scrolling the data associated with the region in a window of the display screen.

8. The method as recited in claim 6 further comprising providing a user controlled parameter for controlling the speed of the scrolling.

9. The method as recited in claim 6 wherein the scrolling direction is horizontal and wherein the window of the display screen wherein the selected region is displayed is horizontal.

10. The method as recited in claim 5 wherein the enhancement is a transformation comprises presenting a central portion of the region in a normal size and proportion and wherein a periphery of the region is compressed.

11. The method as recited in claim 5 wherein the enhancement is a transformation comprising presenting a central section of the region in a magnification corresponding to a spherical obloid shape.

12. The method as recited in claim 5 wherein the enhancement is a transformation comprising continuously scrolling of the information presented in the region.

13. The method as recited in claim 5 wherein the enhancement is a transformation comprising presenting a focus portion of the region in a minimally distorted manner and providing a context area outside of the focus area, said context area generated by applying a non-linear warp to the region.

14. The method as recited in claim 13 wherein the focus portion is at a periphery of the redrawn region.

15. The method as recited in claim 1, wherein analyzing the image of the web page to segment and identify the plurality of coherent regions from the image of the web page is performed without resorting to the web page's code.

16. The method as recited in claim 1, wherein analyzing the image of the web page to segment and identify the plurality of coherent regions from the image of the web page comprises segmenting and identifying the plurality of coherent regions by common background color, blocks of text, use of text headings, borders, and/or identifying images.

17. The method as recited in claim 1, wherein the plurality of coherent regions form together the entire image of the web page.

18. A method for processing a web page comprising:
receiving data corresponding to a web page;
rendering the data to generate an image;
applying an image processing technique to automatically segment and identify from the image a plurality of coherent content segments;
mapping the plurality of coherent content segments to a respective plurality of computer code segments associated with the web page; and
redrawing the web page by reformatting a first computer code segment of the plurality of computer code segments and filtering out a second computer code segment entirely, wherein redrawing includes automatically selecting the first computer code segment, wherein automatically selecting the first computer code segment includes automatically identifying, via a processor, a user's web page usage habits, wherein the processor is configured to learn characteristics and locations of regions typically rejected by the user.

19. The method as recited in claim 18 wherein at least one of the coherent content segments is repositioned in the redrawn display.

20. The method as recited in claim 18 wherein the reformatting comprises one of magnification, spherization, reduction, and dynamic scrolling.

21. A method of modifying a presentation of a web page, the method comprising:
translating markup language code for a web page to a rendered image representation;
segmenting and identifying automatically from the rendered image representation a plurality of coherent regions by analyzing the image using an image processing technique to automatically segment and identify the plurality of coherent regions from the rendered image representation;
automatically selecting and assigning, by a processor, a first coherent region of the plurality of coherent regions to a window in a redrawn image appearing on a display and filtering out a second coherent region entirely, wherein automatically selecting the first coherent region includes automatically identifying a user's web page usage habits, wherein the processor is configured to learn characteristics and locations of regions typically rejected by the user; and
redrawing the web page on the display to generate an image having at least one window.

* * * * *